(12) United States Patent
Hall et al.

(10) Patent No.: US 6,907,559 B2
(45) Date of Patent: Jun. 14, 2005

(54) METHOD AND APPARATUS FOR DATA REPRODUCTION

(75) Inventors: Trevor G.R. Hall, Twickenham (GB); Bruce Murray, Wokingham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 550 days.

(21) Appl. No.: 10/024,742

(22) Filed: Dec. 20, 2001

(65) Prior Publication Data

US 2002/0083394 A1 Jun. 27, 2002

(30) Foreign Application Priority Data

Dec. 22, 2000 (GB) .............................................. 0031436

(51) Int. Cl.⁷ ...................... G11C 29/00; H03M 13/09; H03M 13/29
(52) U.S. Cl. ...................... 714/769; 714/755; 714/785
(58) Field of Search ............................... 714/755, 769, 714/785

(56) References Cited

U.S. PATENT DOCUMENTS

| 5,465,244 A | 11/1995 | Kobayashi et al. ........... 369/50 |
| 5,996,105 A | 11/1999 | Zook ........................ 714/755 |
| 5,996,107 A | 11/1999 | Tomisawa ................... 714/766 |
| 6,079,046 A | 6/2000 | Tamura et al. .............. 714/781 |
| 6,158,038 A * | 12/2000 | Yamawaki et al. .......... 714/755 |
| 6,332,206 B1 * | 12/2001 | Nakatsuji et al. ........... 714/755 |
| 6,651,208 B1 * | 11/2003 | Tran et al. .................. 714/755 |
| 2002/0083393 A1 * | 6/2002 | Hall et al. ................... 714/785 |

FOREIGN PATENT DOCUMENTS

| EP | 0939403 A2 | 1/1999 | .......... G11B/20/18 |
| EP | 0942421 A1 | 9/1999 | |
| JP | 09246996 | 9/1997 | |
| JP | 10154941 A | 6/1998 | |
| JP | 10173546 A | 6/1998 | |
| WO | 9837555 A1 | 8/1998 | |
| WO | 9948097 A1 | 9/1999 | |

* cited by examiner

Primary Examiner—R. Stephen Dildine
(74) Attorney, Agent, or Firm—Michael J. Ure

(57) ABSTRACT

DVD data is read from an optical disc. Double buffering is used for outer error correction syndromes, the syndrome for one ECC frame being accumulated in one syndrome buffer, while error correction calculations for preceding data block are performed using a syndrome accumulated previously in another syndrome buffer). The syndrome buffers are used in alternating fashion as further blocks of data are received, while the flow of data to a main buffer is uninterrupted. This reduces buffering requirements in the decoder, and relaxes time constraints on the error correction calculations. A multi-beam implementation is disclosed, providing higher throughput.

14 Claims, 10 Drawing Sheets

METHOD AND APPARATUS FOR DATA REPRODUCTION

The invention relates to methods and apparatus for data reproduction, and in particular for the retrieval and decoding of data from a rotating carrier such as a Digital Versatile Disc (DVD).

Mass-market optical data storage is familiar in the form of the well-known CD-ROM optical disc format. A historical review and technical description of these and other storage media can be found in The PC Technology Guide, itself available on CD-ROM, and at http://www.pctechguide.com/10dvd.htm. DVD expands upon the capabilities of CD-ROM, in terms of its nominal ("1×") data rate, as well as its data capacity. A DVD/CD decoder is described for example in WO-A-99/48097. Integrated circuits (ICs) incorporating suitable circuitry are available from Philips Semiconductors, for example product SAA7335.

Significantly greater chip area is required for error correction functions in a DVD drive compared with CD-ROM. Like a CD-ROM, the data on a DVD disc is organized into 2 Kbytes sectors, however, while the CD system incorporates essentially a continuous linear code for error protection, operating on a scale corresponding to these sectors, DVD adopts a 2-dimensional block-based scheme, in which the sectors are organized for error protection purposes into larger blocks called ECC frames. A so-called inner correction process is performed on each row of the ECC frame, corresponding approximately to a CD-ROM sector. An outer correction protection process is performed across the rows of the entire ECC frame.

While the inner process is relatively small in duration and buffering requirements, the outer correction process is rather more challenging. Firstly, syndromes require to be accumulated for all the columns of the ECC frame, and sixteen bytes of syndrome are to be updated for each received data byte. This implies that the syndrome buffer is of considerable size, but must be accessible at very high bandwidth, and so must be on chip with the syndrome generator. Furthermore, while the bulk of the user data itself is buffered in external RAM, the error correction circuitry requires access to the stored data to calculate and perform the necessary corrections, based on the information derived from the accumulated syndrome. The data cannot be transferred at full rate to the external buffer while the error corrections are being made, and a FIFO buffer capable of storing 15% or so of a frame is provided in the known decoder chips to absorb the incoming data while error correction calculations are being performed.

The storage requirements of the syndromes and the FIFO contribute to the cost of the implementation, even for a basic "single speed" DVD drive. Moreover, there is a constant race to build optical disc drives with higher throughput, and to provide decoders for multi-speed drives, these elements of the cost become a serious problem. One method of increasing throughput is to increase the speed of rotation of the disc, but practical limitations in disc tensile strength, and in the power consumption have put a limit on the spin speed at between 200 and 400 Hz. For DVD, this equates to an "x" rating of 20–40×.

One solution to the problem of delivering an ever higher data rate from a standard optical disc without increasing the spin speed is the so-called "Multi-Beam" approach. In a Multi-Beam system the read-back laser beam is split in an optical pick-up unit (OPU) into a number of separate beams focused on adjacent radial tracks. With an OPU of N beams, the data can be read (in principle) at N times the rate, for a given speed of rotation of the disc. A multi-beam architecture for CD systems is described in WO-A-98/037555 (Zen Research). More elaborate arrangements with separate read heads are also known, in the context of CD readers, for example from U.S. Pat. No. 5,465,244 (Kobayashi/Toshiba). The Multi-Beam approach also brings the possibility of reducing the power consumption of a drive if data rate is not an issue, as for a given data throughput, the disc spin speed can be proportionally reduced by a factor related to the number of beams. This approach gives significant power consumption benefits for portable equipment, as the power consumption of such drives is dominated by the power dissipated by the spindle motor and drivers.

The problems of memory bandwidth and circuit complexity associated with the demanding DVD error correction, while a major factor in the cost of existing DVD drives, present a major challenge for the implementation of higher-speed DVD drives.

It is an object of the invention to provide improved methods and apparatus for read-out of data from digital storage rotating media. It is a particular object of the invention to enable an efficient implementation of readout from a rotating storage medium, while decoding a 2-dimensional code such as that incorporated in DVD recordings.

The invention in a first aspect provides a method of reproducing data from a continuous data stream, the data stream incorporating an error protection code applied on the basis of a predetermined size of data block, the method comprising:

(a) providing a plurality of syndrome buffers for use in an error correction process, each capable of storing an error correction syndrome from which corrections of data within such a data block may be derived;

and processing said data stream by steps including:

(b) using a first one of the syndrome buffers to accumulate a first syndrome applicable for correction of a first data block;

(c) storing the data for said first data block in a data buffer, without applying corrections derived from said first syndrome;

(d) using a second one of the syndrome buffers to accumulate a second syndrome from which corrections of data within a second first data block may be derived;

(e) concurrently with step (d), using the accumulated first syndrome in the first syndrome buffer to calculate the corrections applicable to said first data block; and (f) after step (e), releasing the first syndrome buffer for use in accumulating a syndrome for a subsequent data block; and (g) using the accumulated second syndrome in the second syndrome buffer to calculate the corrections applicable to said second data block, the process continuing in like manner until all desired data blocks have been processed.

The inventors have recognized that this can effectively decouple the conflicting requirements of large memory and fast processing.

This double-buffering technique decouples the speed of the error corrector, for calculating the errors and locations from the system, as these calculations may now be performed in parallel with the reception of the next ECC Frame of data. Previously, the calculations had to be performed in sequence, and therefore the received data had to be buffered in a FIFO for the run-time of the error corrector. Rather than holding up the flow of data, user data is transferred from the decoder to a main output buffer memory, before the outer error corrections have been calculated and applied. Access to the data buffer for corrections can be spread so as to minimize disruption to the data stream.

In each of steps (e) and (g), the results of the correction calculations may be stored in the first and second syndrome buffers, over-writing the accumulated first and second syndromes respectively.

The method may further comprise (h) applying corrections to each respective block of data in accordance with the results of the correction calculations performed in steps (e) and (g).

The corrections may be applied to the data by read-modify-write operations at selected locations in the data buffer. Alternatively, the corrections may be transferred from the syndrome buffer to another part of the buffer memory, and applied subsequently. The corrections may for example be applied during reading out of each data block from the data buffer.

The first and second syndrome buffers may be permanently designated, or may be designated block-by-block from among a set of more than two physical syndrome buffers.

In a multi-track implementation, the received data stream may be one of a set of N sub-streams being read in parallel, starting from N respective locations within a single recorded data stream, step (a) providing at least 2N physical syndrome buffers. The single recorded data stream may comprise data recorded in a spiral on a disc-like record carrier, such as a DVD. As used above, the phrase "continuous data stream" is intended to encompass each fragment of the recorded data stream which is read in a multi-track apparatus, and subsequently "stitched together" to restore the longer recorded sequence.

In a multi-track implementation, said data stream may commence part way through a data block, step (b) comprising accumulating a partial syndrome only, the method further comprising (a) (i) storing said partial syndrome and subsequently completing the syndrome when the beginning of the same data block is received in another of said streams.

Step (h) may include transferring the partial syndrome from the first syndrome buffer to said buffer memory. Alternatively, the partial syndrome may remain occupying the first syndrome buffer until the beginning of the data block. In the latter case, at least 3N−1 syndrome buffers may be provided in step (a).

If transferred, the partial syndrome may be transferred back into one of said syndrome buffers for completion. Alternatively, completion of the syndrome may take place in said buffer memory, or even subsequently, such as upon read-out.

The first and second syndromes may form part of an outer error correction process, each data block comprising a number of sub-blocks subject within themselves to an inner error correction process, the data stored in step (c) block being stored in said buffer after undergoing said inner error correction process. Said sub-blocks may be regarded as rows of a two-dimensional matrix, the inner error correction being applied to individual rows the matrix, relatively localized within the received data stream, while the outer correction process is applied to columns of the matrix, extending relatively widely within the data stream.

The invention in a second aspect provides a method of data processing, the data comprising DVD data recorded on an optical disc, wherein double buffering is used for outer error correction syndromes, the syndrome for one ECC frame being accumulated in one buffer, while error correction calculations for preceding data block are performed using a syndrome accumulated previously in another syndrome buffer, the syndrome buffers being used in turn as further blocks of data are received.

In a preferred embodiment, the data for each block are transferred to a buffer memory not integrated with the syndrome buffer, before the corresponding corrections are calculated or applied.

The invention further provides an apparatus for reproducing data stored on a record carrier, the apparatus comprising disc transport means including a pickup for reading data from the carrier, signal processing means for recovering data from the carrier and a decoder for decoding and error-correcting the data read from the carrier, in accordance with error correcting codes included therein, wherein the decoder is arranged to implement a method according to the first or second aspect of the invention as set forth above.

The invention yet further provides a decoder comprising input means for receiving a continuous data stream in parallel plural sub-sequences of a first sequence of data to be decoded, and wherein the decoder is arranged to implement a method according to the first or second aspect of the invention as set forth above.

The decoder may comprise an integrated circuit including inner and outer correction error correctors, and buffers for the storage of at least one outer error correction syndrome per channel, and means for transferring a partial syndrome to external memory after encountering the end of a block of data.

Embodiments of the invention will now be described, by way of example only, with reference to the accompanying drawings, in which.

OVERVIEW OF DVD READER ARCHITECTURE AND ARCHITECTURE AND ERROR CORRECTION FORMAT

Figure 1:
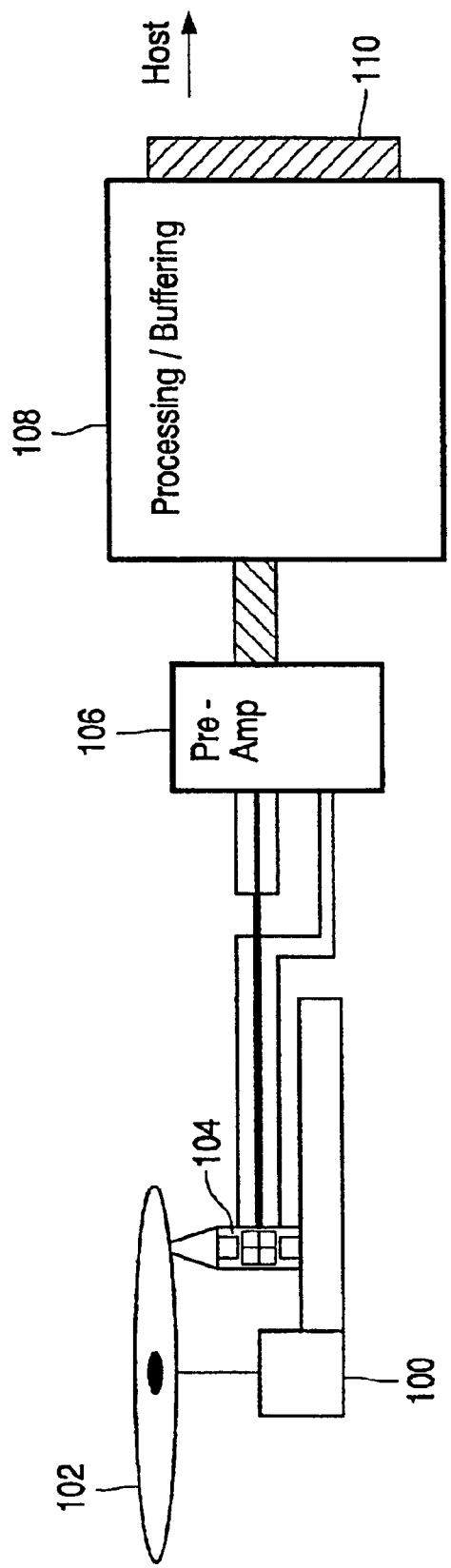
FIG. 1 illustrates schematically the structure of a known single-beam reproducing apparatus for DVD.

FIG. 1 shows the basic elements of an optical disc reproducing apparatus, in this case a DVD-ROM drive for use with a host computer, or part of a consumer DVD player for audio and video material. The key features: are a transport mechanism 100 for the disc 102, an optical pick-up (OPU) 104 driven and focussed by various servo systems of known type, pre-amplifier 106, processing and buffering circuits 108, and an interface 110 to the computer, audio/video playback system, or other host. The present disclosure concerns primarily the processing and buffering circuits 108, and the other elements will not be described in any more detail.

Figure 2:
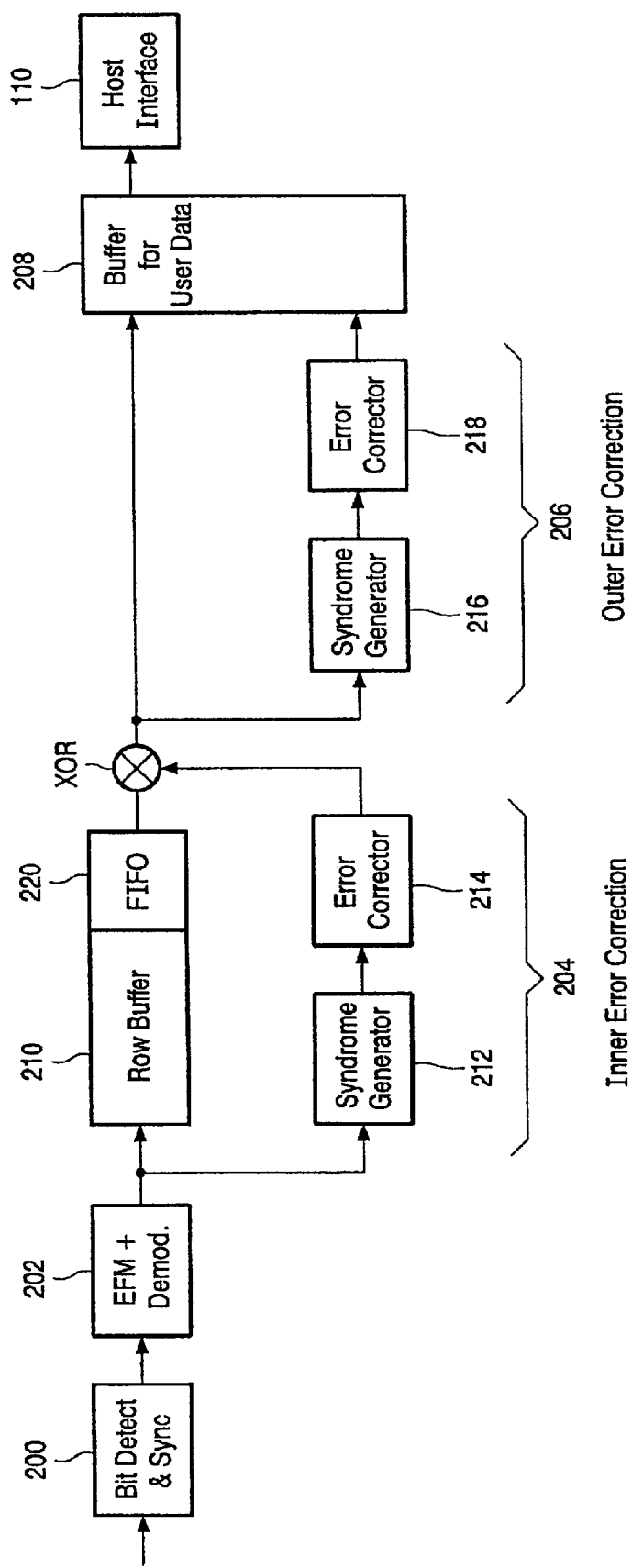
FIG. 2 shows in block schematic form the process of decoding DVD data.

FIG. 2 shows that the read data path of a DVD-ROM system is a complex structure consisting of bit detection 200, EFM+ demodulation 202, error correction 204 & 206, storage buffer 208 and host interface 110. Error correction is performed in two stages: inner error correction 204 and outer correction 206. Both types of error correction assume that a syndrome (or "signature") is generated (212/216 respectively) for a particular codeword. In the case of inner error correction, a codeword PI is given with a row of the recording sector, stored in a row buffer 210. Outer error correction is performed over the columns of the same sector using an outer codeword PO. The generated syndrome is then applied to an error correction module (214/218) that calculates the address and value of all correctable errors. Assuming that only correctable errors are present, the original data is recovered by applying the obtained corrections to the erroneous data. The outer correction process requires access to the buffer 208, which necessarily interrupts the flow of data arriving from the pick-up via the inner corrector. To absorb these interruptions without loss of data, a FIFO buffer 220 is provided at the output of row buffer 210. Having applied the corrections to the data, it is transferred via host interface 110 to the user.

In practice, the various elements 200–220 may be implemented by circuits dedicated to that function, or they may be implemented by a suitable combination of programmable hardware and software achieving the same function.

Figure 3:
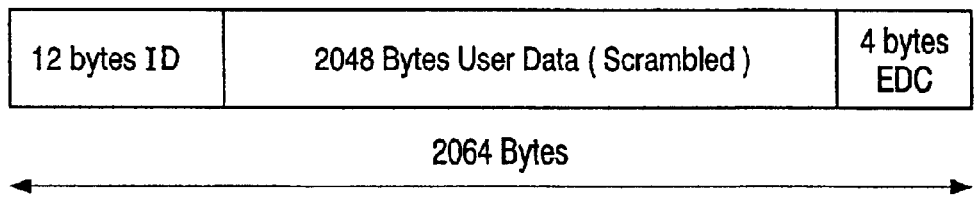
FIG. 3 illustrates a DVD data sector format.

FIG. 3 illustrates the DVD data sector format for data stored on disc 102. Raw computer data is broken into 2048-byte sectors, as in CD-ROM. Each DVD data sector is 2064 bytes long and comprises 12 bytes Identification (ID), which contains Physical Sector address & ID, the data, and four bytes of error correction and detection codes EDC. Note that this is shorter than a CD-ROM sector (2352 bytes).

Figure 4:
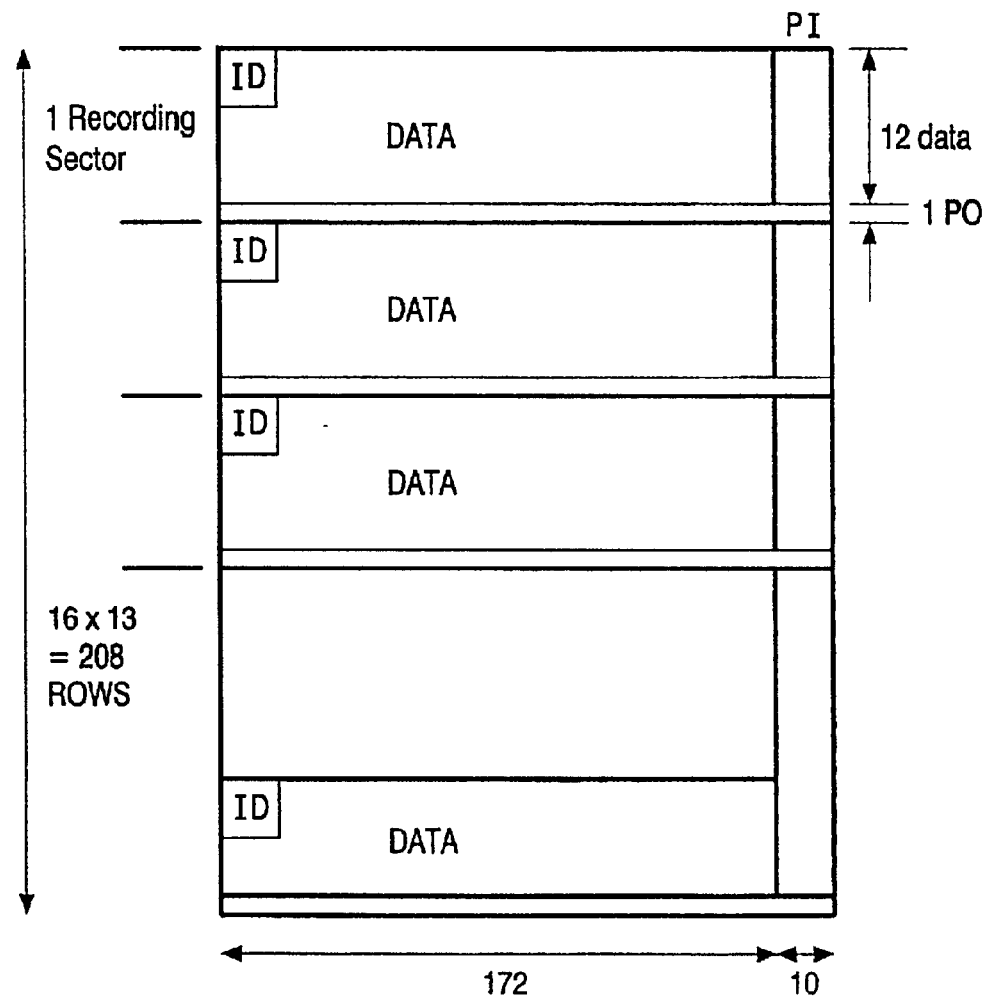
FIG. 4 illustrates the structure of an ECC frame in DVD, including 16 data sectors and error correcting code words.

FIG. 4 illustrates how 16 of the sectors shown in FIG. 3 are combined into a Recording Block or error-correcting code (ECC) frame using a RS (Reed-Solomon) Product Code. RS-PC is a block code, meaning that error correction (ERCO) operates over buffered blocks of data, these being the ECC frames. This is a more powerful (efficient) code than the CIRC plus 3rd level (C3) protection, employed in CD-ROM. Error Correction redundancy is approx. 13% (half that of CD). The ECC frame comprises 16×13=208 rows of 182 bytes of data within each row (not shown) data are encoded by EFM+ modulation, and two 32-bit sync codes (not shown) are inserted before the 0 and 91 byte positions in each row.

Each 2064-byte data sector occupies spread over 12 rows of the ECC frame, each row comprising 172 sector data bytes and 10 PI Bytes, which are the codewords (parity) added for the inner error correction. There are 16 Data Sectors in each ECC frame. After every 12 rows, a 13th row PO is added. The sixteen PO bytes in each column form a 16-byte outer protection codeword for reach column of the ECC block. The code operates over rows and columns of a data matrix giving a T=5 correction code over rows, and T=8 over columns.

The sync patterns inserted every 91 bytes vary, according to their position in the block. In particular, the first sync pattern in each recording sector, which is immediately followed by the ID field of the data sector, is unique within the ECC frame. In this way, the EFM+ decoder can readily identify the start of rows 0, 13, 26 . . . and every 13th row within the ECC frame, where the sector ID field is to be found.

It is found that the size of the buffers used in the data path represents a significant cost in a hardware implementation. DVD inner codewords correspond to a row of a DVD recording sector which consists of 172 data bytes plus 10 bytes parity check code. This implies that the row buffer 210 in FIG. 2 is at least 182 bytes long. In practice, this row buffer is used to store one codeword during syndrome generation, one codeword being error corrected and acts as buffer for the input and output data. Therefore, it may be assumed that an upper bound of the buffer size is 4 times 182 bytes or 728 bytes. In addition to the data buffer, some storage for the syndromes is needed which, in case of inner correction, equates to 10 bytes.

The DVD outer codewords correspond to the columns of the DVD recording sector and hence a much bigger amount of data must be considered. As there are 172 columns (length of a row) and 192 data rows in a recording sector, a buffer of 32 Kbytes size is required. Since it is expensive to integrate a buffer of this size into an IC, it is more efficient to calculate the syndromes while the data is being transferred into an external DRAM memory. This is possible as the correction process is only based on the syndrome and all corrections are applied in a read-modify-write operation to the external DRAM. This is indicated in FIG. 2 with the two input channels to the buffer, one for the data after inner correction and the other for the results of the outer correction.

Performing the error correction over the 172 columns of the recording sector implies that 172 syndromes of 16 bytes length must be stored, resulting in a storage requirement of 2752 bytes. Due to the fact that the data stream is still continuing while the calculated syndromes are applied to the error corrector, however, the FIFO buffer 220 is needed, with a typical capacity of 5 Kbytes (approximately 15% of the ECC frame).

Besides the buffers described above, there are also a number of computational blocks in the DVD-ROM Data path that contribute to the implementation cost. The most expensive block is the error corrector which typically has a gate count of well over 10,000 gates. The EFM+ demodulator (often realized as ROM lookup table) and syndrome generators are significantly smaller and each have a size less than 20% of the error corrector size. Therefore, the error corrector is often implemented as a shared resource in inner and outer error corrector.

Syndrome Double Buffering

Figure 5:
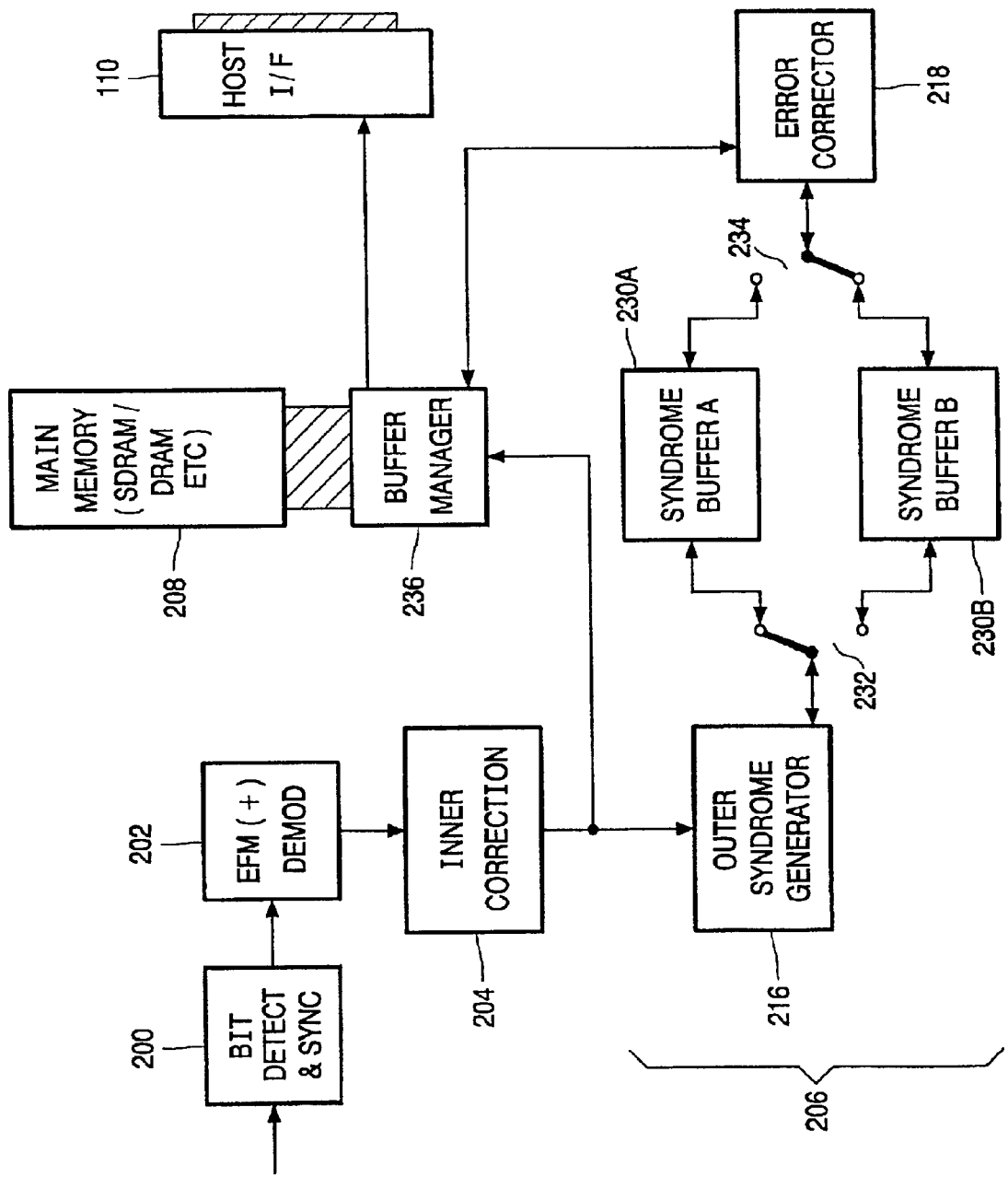
FIG. 5 illustrates a process of decoding DVD data with syndrome double buffering, in accordance with the present invention.

FIG. 5 is a modified block diagram showing the data path in a modified decoder, featuring a double syndrome buffer. Parts having the same functions are numbered as in FIG. 2. Significant changes are in the out error corrector 206, where a syndrome buffer used by both the outer syndrome generator 216 and the outer error corrector 218 has been duplicated. Two syndrome buffers 230A and 230B are provided, each capable of holding one complete outer syndrome (182×16 bytes). Via selection circuits 232 and 234, one of the buffers is connected to a syndrome generator 216 while the other is connected to the outer error corrector 218. User data after the inner ERCO circuit 204 is stored directly to the buffer 208 via buffer manager 236. Buffer manager 236 also permits the outer error corrector 218 to access the stored user data.

In operation, a syndrome for a complete ECC frame is accumulated in buffer 230A (for example), while the data for that frame flows, uncorrected by the outer error correction process, into the main memory buffer 208. At the end of the frame, the selectors 232, 234 switch the roles of the syndrome buffers 230A and 230B, so that buffer 230B can immediately begin accumulating the outer error protection syndrome for the next frame. The data for the next frame thus flows, without delay, from inner ERCO circuit 204 to the main buffer 208. FIFO buffer 220 is thereby eliminated, or at least reduced from 5 Kbytes to a few bytes. While this next frame is flowing, error corrector 218 has the opportunity to process the syndrome remaining in buffer 230A to derive the error location and value information relating to the completed ECC frame. The results of this calculation can conveniently be stored back in the syndrome buffer. The results are then used to correct the errors by read-modify-write access to the main buffer 208. This access can be interspersed throughout the frame period, so avoiding any disruption to the flow of data for the next frame.

At the end of the next frame, the roles of the syndrome buffers 230A and 230B are again reversed, and the process continues for the duration of the data stream reproduced from disc.

Variations on the above scheme are possible. In particular, the total number of syndrome buffers is not limited to two, and the space for buffers 230A and 230B can be allocated dynamically from a larger body of storage, if desired. The corrections need not be made by read-modify-write operations in buffer 208. They could be deferred and performed on-the-fly during read-out of the data from the buffer to the host. Alternatively, the error location and value information could simply be stored in the buffer alongside the user data, for future reference.

Multi-Beam System

For a faster total data reading rate, a multi-beam system might be envisaged, as is known already in CD-ROM systems such as that of WO-A-98/37555 mentioned above. In a simplistic approach to a multi-beam decoder (not illustrated) the entire data path of FIG. 2 can be replicated N times for an N Beam system, the data from these N channels being recombined in a large RAM buffer. The chief disadvantage of this approach is that the error correction logic is replicated N times and the ERCO buffer (32 kByte) and the Syndrome RAMS (2 k7 byte) are replicated N times. This makes for a very expensive one-chip decoder. Using the syndrome double buffer technique, however, at least the 5 k FIFO need not be replicated.

Figure 6:
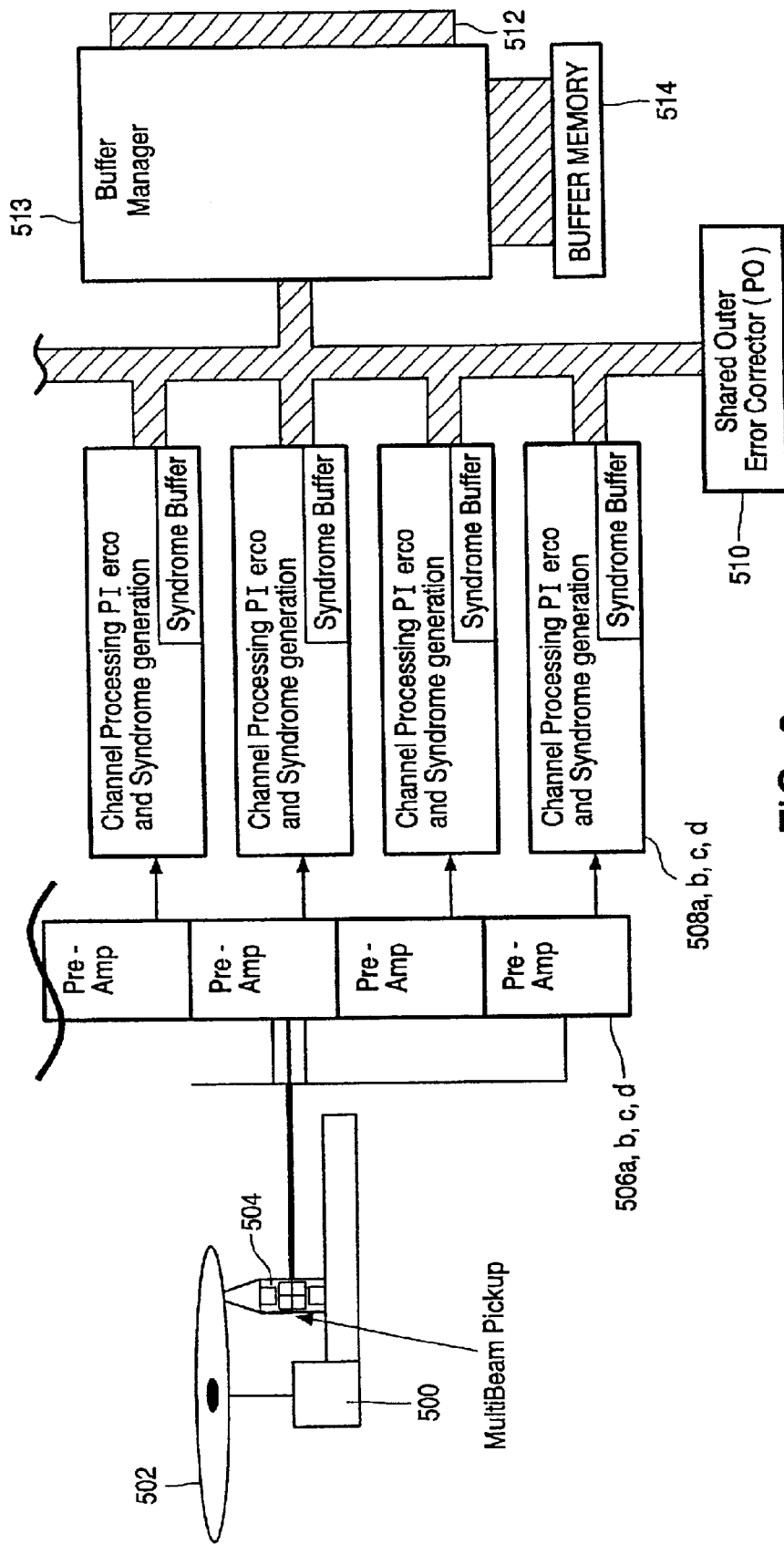
FIG. 6 illustrates schematically the general structure of a multi-beam DVD reproducing apparatus.
Figure 7:
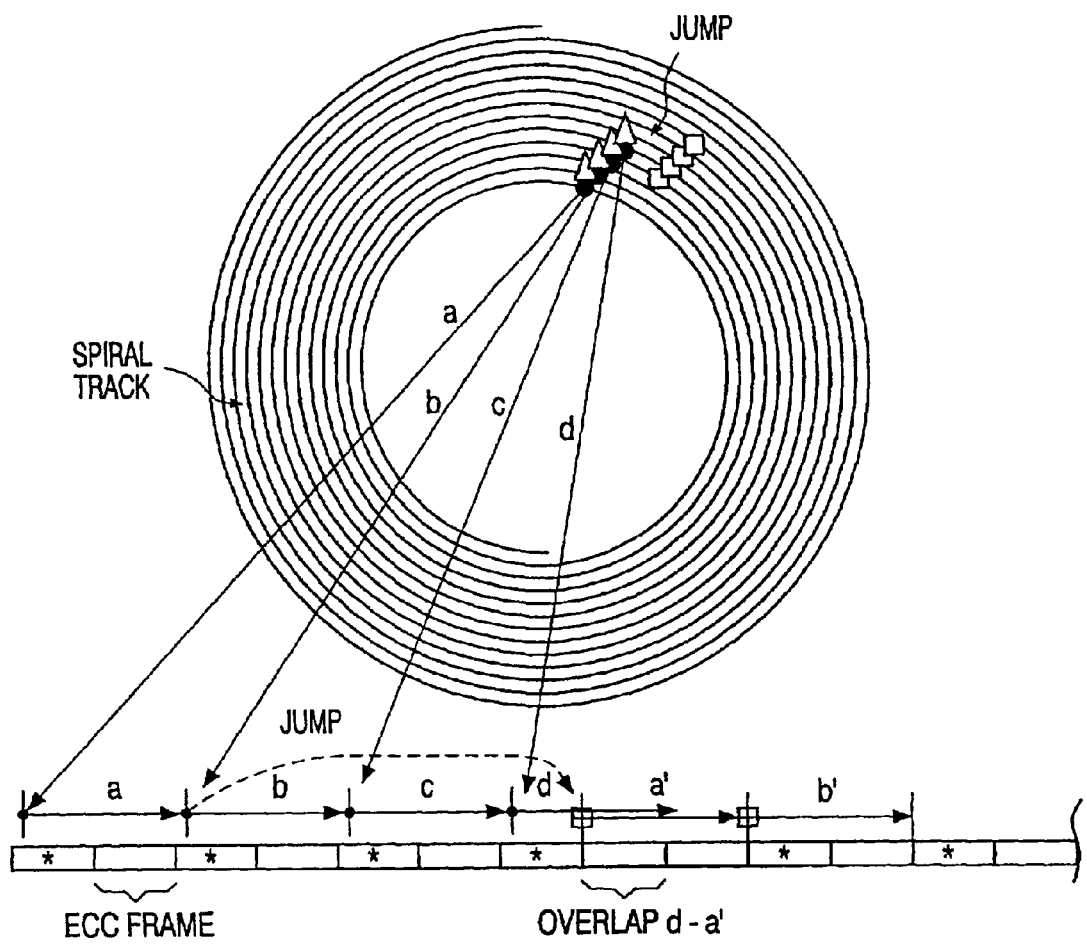
FIG. 7 illustrates the process of multi-beam read-out from an optical disc in DVD.

FIG. 6 illustrates a more sophisticated multi-beam system, and one in which the syndrome double buffering and partial syndrome calculation mentioned in the introduction can be applied to advantage. A conventional (or high-spin speed) DVD disc transport 500 and disc 502 are supplemented with a multi-beam OPU 504 having N beams, and outputting read-out signals in N parallel channels. N=7 will be a typical figure in the embodiments which follow, although only four channels are shown in FIGS. 6 and 7, for clarity. Separate pre-amp stages 506a, b, c, d are provided, one per channel, and similarly channel processing up to and including inner ERCO processing is performed in parallel by circuits 508a, b, c, d.

By suitable control of the memory interface in buffer management block 513, the main ERCO buffer can be placed into the external SDRAM 514, and parts of the error corrector may be shared between the channels. The extended functions of the buffer manager, compared with that of a single-beam system, will be described later in relation to FIG. 11. In the arrangement of FIG. 6, the inner corrector is conventional, and the outer syndrome generation (very high memory bandwidth) is on-chip, while the main buffers are off-chip in memory 514. A shared outer corrector 510 is used. These features will be exemplified in more detail with respect to the later Figures. Depending on the performance of the outer ERCO circuit, alternatively, a number of parallel outer correctors may be used to increase performance. A variety of designs can be made by adjusting these parameters to trade performance against complexity and power consumption.

FIG. 7 illustrates the process of multi-beam read-out on an (exaggerated) spiral track of a DVD or CD. Channels a, b, c, and d are related to beam spots which follow four adjacent tracks on the disc. Beam a is the innermost of the four, and beam d is the outermost. In the diagram, it is represented that the beams move around and outward over the disc surface. In reality, of course, the disc rotates while the OPU stays at the same angular position, but tracks radially outward. While the adjacent points can be regarded as four parallel tracks, it must be remembered that they are in fact simply points on one continuous spiral, so that, after one revolution, beam a reaches the position where beam b started, and so forth. The single linear sequence of data laid down in the spiral track is represented at the foot of FIG. 7, with ECC frame boundaries being represented.

Black circles show the beam positions at the start of a first revolution. The corresponding positions within the data are shown on the linear representation at the foot of the figure. Triangles show the positions of the beams after one revolution. Squares show beam positions a', b' etc. after one revolution and a jump. It will be seen that data is lost due to jump latency until a complete disc rotation has finished. For this reason, the maximum jump is effectively N−1 tracks, and channel a takes over at a point a' part way through the portion most recently covered read be channel d.

It is noted that, in general, read-out after a jump will begin part-way through an ECC frame. ECC frames marked with an asterisk "*" in FIG. 7 are only partially read by any one beam and this results in partial or out of order data arriving at the outer syndrome generators. This is not such a problem in CD-ROM systems, where the error correcting code is linear, and valid data can be decoded a short time after jumping to a new track location. In DVD however, decoding requires a complete ECC frame before valid data is obtained out of the inner and outer ERCO processes. The present apparatus is arranged to accumulate partial syndromes, however, on a sector basis, using the sector ID fields to identify its location when jumping to the middle of an ECC frame. This technique is the subject of our copending application [ID400196], mentioned above.

DETAILED EXAMPLES OF MULTI-TRACK DVD-ROM SYSTEMS

As explained above, in order to reduce spin speeds while still maintaining or increasing performance and throughput, data is read from several parallel tracks in the proposed multi-track DVD-ROM systems. Different architectures can be envisaged, however, depending on the point in the data path (FIG. 2) at which the data that is received from the N parallel input channels is recombined into a single data stream. Obviously, the location of this recombination block has a significant impact on cost and performance of the resulting system. In a first detailed embodiment, to be described with reference to FIGS. 8 to 10, recombination will be performed just after bit detection or EFM+ demodulation, resulting in a system where the main decoding electronics remain virtually unchanged from a single spot system. Other solutions for higher throughput rates and added flexibility are disclosed in the copending application [ID400196],which move the recombination after the inner or outer error corrector, allowing more detailed trade-offs between maximum performance and system cost.

The functional blocks of the standard DVD decoding process (FIG. 2) will be recognized in these embodiments.

The differences arise naturally in the number of instances of each block, where parallelism comes into play, and in the additional configurability and control logic for the handling of recombination of streams and partial data.

For the purposes of illustration, the following practical examples are based on the following assumptions:

Expected user data rate: 64× DVD (just under 90 MByte/sec).

N=7 channel multi-track system.

Data recombination based on EDC frames.

System efficiency after jumping and data synchronization has been taken into account: 80%.

Required performance in each input channel: 11.5× DVD, individual channel data rate=nearly 38 MByte/sec.

First Example

Recombination Before Error Correction

Figure 8A:
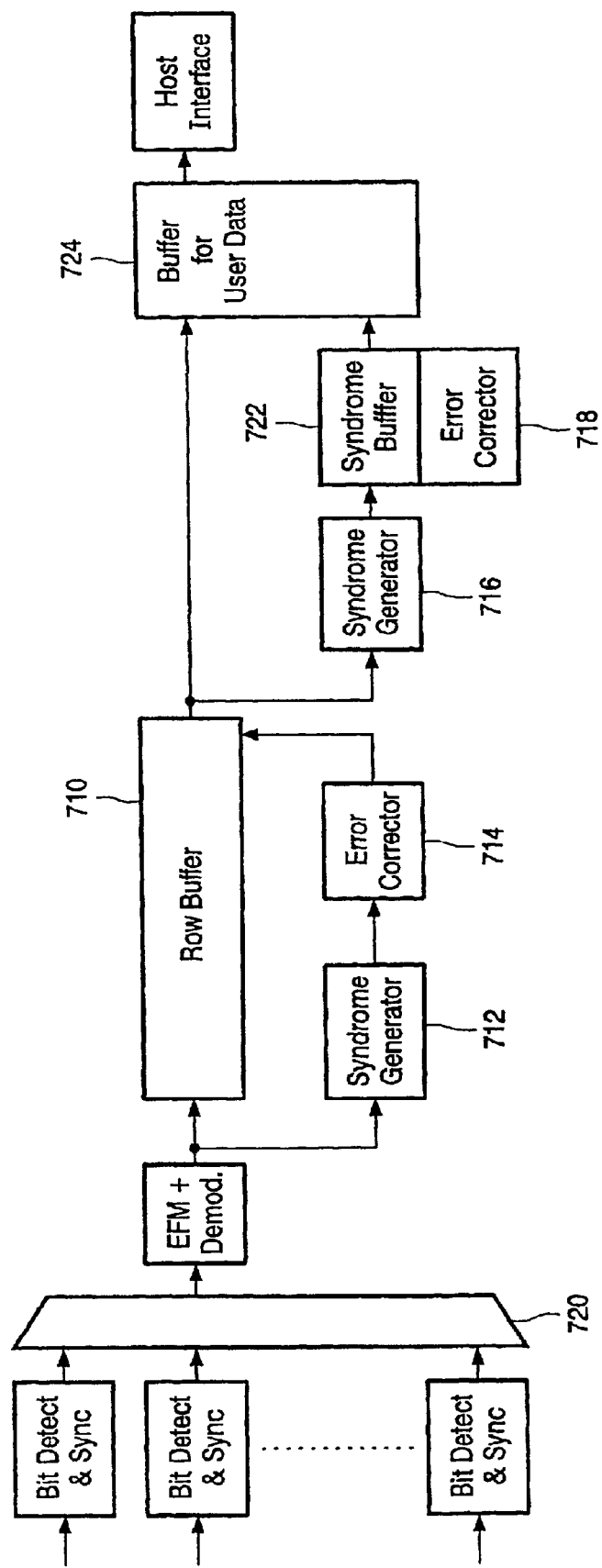
FIG. 8 shows in block form a multi-beam DVD decoder circuit according to a detailed embodiment of the invention, with variations (a) and (b)
Figure 8B:
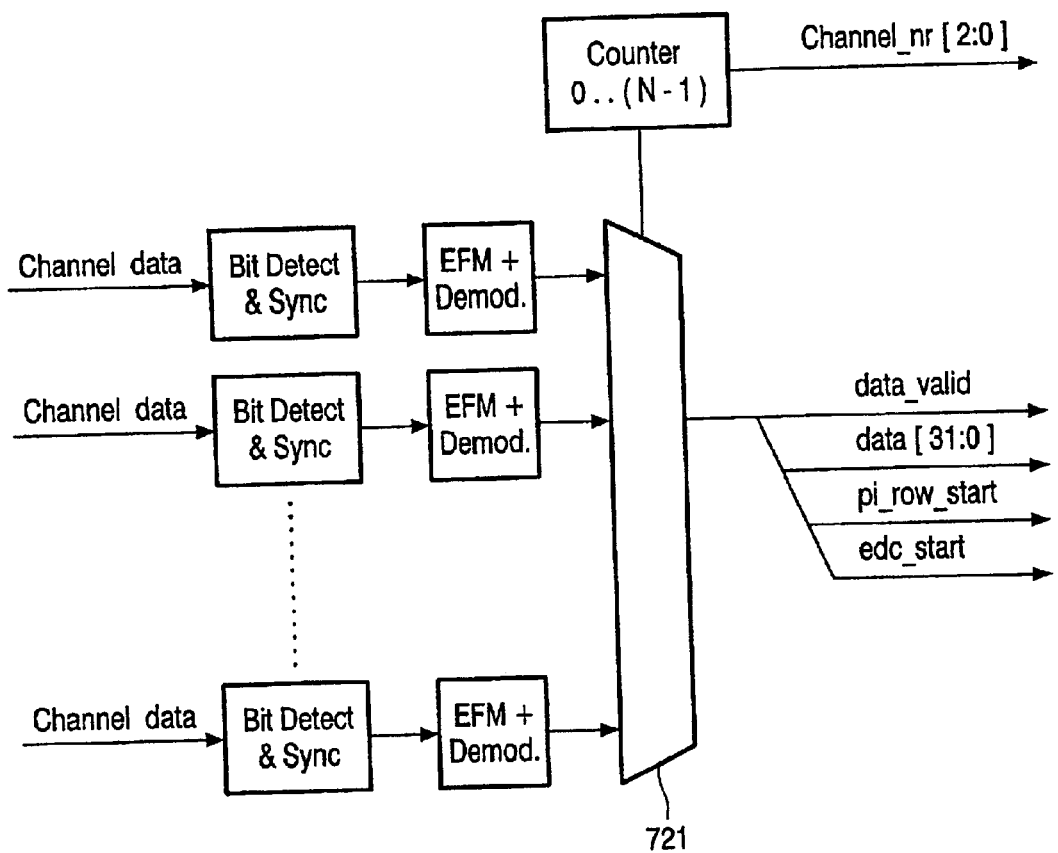

FIG. 8(a) shows the block diagram of a system with buffer-less recombination where a multiplexer 720 is used to transfer the incoming data bytes into the EFM+ decoder. Alternative arrangement (b), of which the front end only is shown, has a separate EFM+ demodulator for each channel, and the multiplexer 721 feeds into the row buffer of the inner error corrector section. The operation of the two variants embodiments is similar. However, the volume of data passing through the multiplexer will be much less in case (b). A dynamic syndrome buffer 722 is provided, in association with the outer ERCO circuitry, as will be described in more detail, with reference to FIG. 9.

As mentioned in the general discussion of the DVD data format, the EFM+ sync words which are inserted every 91 bytes allow the EFM+ decoders to identify the boundaries of rows and sectors in the ECC frame structure. The designers of the present apparatus have recognized that this valuable information is in fact available at an early stage in the data path. This allows data, particularly partial data, to be directed immediately to suitable buffer locations, rather than being held "in limbo" pending a deeper decoding of the sectors themselves. The various flags which are generated by the EFM+ demodulator to identify row and sector boundaries are shown as outputs of the multiplexer in FIG. 8(b):

data[31:0], four data bytes at a time, data_valid, indicating whether valid data is present, pi_row_start, indicating that a new PI codeword starts, edc_start, indicating the start of a new ECC recording sector and channel_nr, indicating from which input channel the current data originates.

Before discussing FIGS. 9 and 10 in detail, the operation of this arrangement will be described in outline. Once an entire row containing a PI-codeword has been transferred into the row buffer, the syndrome is generated and applied to the error correction module. Once all corrections have been made in the row buffer, the codeword can be handed over to the outer error corrector. Note that the results of the inner error correction process are useful as "hints" to the outer process. For example, the inner syndromes may reveal erasure of the entire row of data. This information can be used, in addition to the outer codewords PO, to locate errors within the columns, which assists the outer ERCO process.

This approach requires a inner row buffer of the following size: N buffers of 182 bytes to accommodate incoming PI codewords, (N−1) buffers waiting for processing, 1 buffer used during inner syndrome generation, 1 buffer used in the inner error correction process and 1 buffer for the data transfer to the outer error corrector. This is in total (2N+2) buffers. With N=7, 16 buffers of 182 bytes are needed, resulting in a storage requirement of 2912 bytes. In addition to the physical storage space, the row buffer must also contain logic that controls the input multiplexer, generates addresses for the physical buffer and identifies completed rows which are complete and ready for correction. Furthermore, the control logic must ensure that corrections are written back to the correct buffer, fully corrected data is transferred to the outer error corrector and that unused buffer space is reallocated to the input buffering process.

The buffer-less implementation of the stream recombination implies that outer parity codewords PO from N different recording sectors are presented to the outer corrector, thus resulting in the simultaneous generation of N syndromes. Therefore, additional control logic is needed to associate incoming data with a particular syndrome buffer and, when a particular syndrome has been completed, hand it over to the error corrector. Also, the control logic must ensure that the corrections are written to the correct address in the user data buffer.

With respect to the storage requirements, it is apparent that the syndrome buffer, with the double buffering to be described in more detail below, must store the N syndromes that are currently being calculated, N−1 syndromes that are awaiting corrections and 1 syndrome used in the current error correction process. Furthermore, it can be seen that before and after a jump only parts of an ECC sector are transferred via an input channel. This means that after a jump has been completed, up to N−1 partially calculated syndromes are calculated for ECC sectors whose first rows have been missed. The missing rows are read off the disc by a neighboring input channel at the end of a disc rotation. The corresponding partial syndromes could be stored in the syndrome buffer 722. However, in order to minimize the size of this on-chip buffer, they are in the novel system stored in the off-chip user data buffer 724. If all syndromes were stored locally, 3N−1 syndrome buffers are needed, resulting in a total buffer size of 55040 bytes.

When partial syndromes are stored in external memory, the amount of syndrome buffers reduces to 2N. If also the N−1 syndromes awaiting correction are stored in external memory, there will be only N+1 buffers. In low performance systems, it may be possible to store N−1 of the syndromes in generation in external memory thus reducing the number of buffers to 2. Note that the described method of syndrome calculation requires that all incoming data bytes are pre-multiplied with the correct alpha value. Note also, that the size of the external user data buffer is determined by twice the amount of data on a disc rotation which is around 2 MByte. This is because the corrected data is placed into the buffer in a non-linear way and only after a full disc rotation it is possible to obtain a serial data stream.

Based on the assumptions given above, after EFM demodulation, the data rate in each of the channels is about 18 MByte/sec which equates to an overall transfer rate over 120 MByte/sec. To cope with this high data rate, it is suggested to increase the bus width such that a lower clock frequency is obtained. A bus width of 32-bit is suitable here. A clock frequency of 75 MHz is more than efficient to accept the data bytes from the individual channels, group them into a 32-bit word and multiplex them out of the stream recombination block.

Buffering of PI Codewords and Inner Error Correction

The central element of the inner correction section is the row buffer 710 as it is used to reconstruct the data coming in from EFM demodulation into PI-codewords, identify completed codewords and initiate syndrome generation at 712, hand syndromes over to the error corrector 714 and ensure that corrections are written back into the row buffer. Furthermore, the data after inner correction must be transferred to the outer error correction section. The row buffer 710 is notionally divided, as shown by dashed boundaries in FIG. 9, according to these four functions.

It is within the capabilities of the skilled person to implement these functions, which for the most part simply involve replicating elements of the single-beam decoder known already. Further detail of the Row Buffer and inner corrector is included, however, in our co-pending application mentioned above [ID400196].

Outer Syndrome Handling and Error Correction

Figure 9:
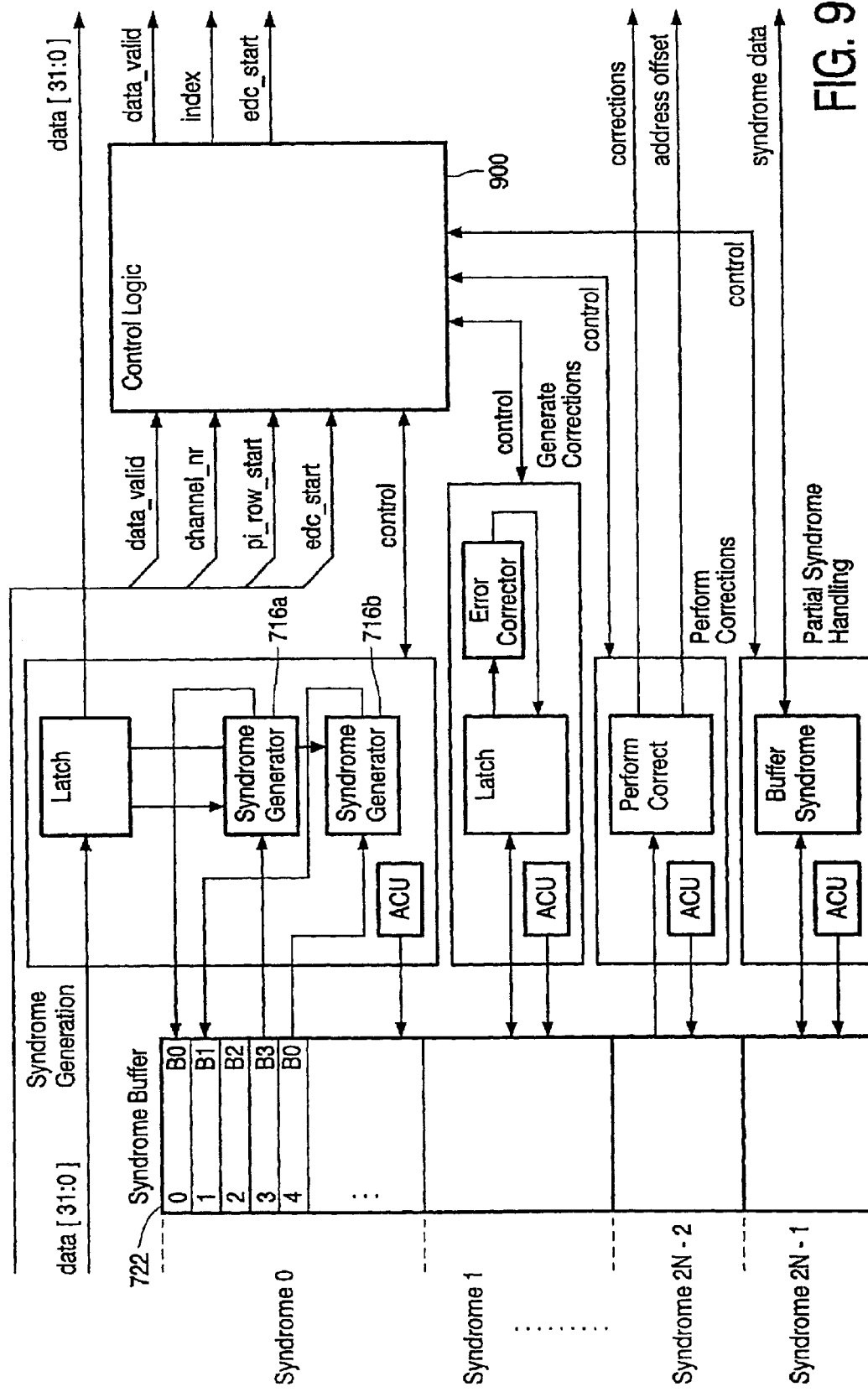
FIG. 9 shows in more detail an outer error corrector in the circuit of FIG. 8.

FIG. 9 shows the Outer Syndrome Handling and Error Correction 716, 718, 722 in more detail. As with current error correctors, syndrome generation for the PO codewords is a problem due to the high bandwidth requirements. For each data byte that is transferred into the outer error correction section, 16 syndrome bytes must be read, updated and written back into the memory. This problem is further complicated by the fact that four data bytes are received at a time, at a rate of 30 MWords/sec from the inner correction section. To overcome the problem associated with the high throughput it is suggested to use two syndrome generators 716a, 716b running at 75 MHz. Pipelined construction of the module allows a 16-byte syndrome and a data item to be processed every clock cycle. The two combined generators provide then a processing capability of 150 MByte/sec.

Sufficient memory bandwidth for the two syndrome generators is provided through the use of 4 interleaved memory banks B0–B3 within the syndrome buffer 722. Two memory banks are used to read syndromes for the two syndrome generators, and the remaining two banks are employed to store the two modified syndromes related to a previous data item. This leads to a memory configuration of 128-bit (16-byte) arranged in four banks. (Note that if the memory were operated at twice the system frequency (150 MHz), the bank count could be reduced to two.) These banks or bank pairs correspond to the syndrome buffers 230A and 230B in FIG. 5.

When four memory banks are used, the access rate to each individual bank is determined by the fact that 120 MByte of data are transferred per second. As already described, two simultaneous reads are performed from two different memory banks, thus resulting in an single bank access rate that is half the incoming data rate: 60 MByte/sec or 63 million accesses.

So far it has been shown that the N=7 syndrome buffer 722 provides sufficient memory bandwidth for the actual generation of the syndromes. Here it is investigated whether it is possible to cache all of the syndromes in external memory. If this were possible, only N=7 syndrome buffers will be needed. The first issue in syndrome caching is the bandwidth required for the retrieval of completed syndromes out of the buffer. Assuming a clock frequency of 75 MHz and an access rate of 63 MHz, it is apparent that 85% of the bandwidth is used, 15% is still available. It can be shown that in situations where more than two ECC frames are completed at the same time, there is not sufficient time to copy a syndrome from the syndrome buffer into a different location: an available bandwidth of approximately 35% is needed.

Of course, memory bandwidth can always be increased to suit, but at cost. In the present embodiment, syndrome double buffering is used in addition to caching of partial syndromes. Double buffering of syndromes means that two syndrome buffers are used for each channel, one buffer being used for the generation of a syndrome set, the other containing completed syndromes before they are applied to the error corrector. Once a syndrome has been transferred to the error corrector, it is subsequently replaced with the error magnitude and location obtained from the error corrector.

Double buffering of course increases the number of buffers to 2 N. As already explained, syndromes are read out of the buffer and correction information is written back.

In the discussion of FIGS. 6 and 7 above, it was outlined that the efficient multi-track systems proposed herein work on a sector (EDC) basis. This is important since each time a jump is performed, it is quite unlikely that the retrieved data lines up with an ECC frame. Instead data transfer starts with EDC sector n and ends with the last frame 15 before data from the following ECC frame is processed. The remaining frames 0 . . . n−1 of the first ECC frame sector are received at the end of a disc rotation from the neighbor channel. This implies that potentially N−1 partial syndromes are generated after a jump (the first channel is either aligned to an ECC frame or starts data processing only towards the end of a disc rotation). Since these partial syndromes cannot be used for error correction, they need not occupy expensive buffer space and can be transferred into external memory.

As explained above, there are two buffers per channel: one for the calculation of the current syndrome and one syndrome used in the correction process. To free the space occupied by a partial syndrome it must be transferred during the time it takes to calculate the next syndrome into external memory. Reading the syndrome requires 172 buffer accesses compared to 12896 possible memory accesses, which means that the transfer is uncritical. Note that bandwidth into external memory is not an issue as the presence of partially corrected syndromes means that the error corrector is not running and hence there is no bandwidth required for corrections. At the time the missing part of the partial syndrome has been generated, it must be combined with the first part that has been stored in external memory. This requires to read the partial syndrome out of the external memory, combine it with the partial syndrome retrieved from the external memory and write it back into the syndrome buffer. At this point in time, error correction can be initiated. Memory bandwidth from external memory and into the syndrome buffer should not be a problem, because the described handling of syndromes is only required at the end of a disc rotation, just before a jump is initiated. Note that the described partial syndrome handling requires a pre-multiplication of the initially generated syndrome with alpha raised to a power depending on the number of the first EDC sector. This can be done before the data is written into the external memory.

The block diagram in FIG. 10 shows again the four tasks that are present in the outer correction section:

1. For each incoming data byte, a 16-byte syndrome must be updated:

Each incoming data quadlet is stored in a latch, two data bytes are utilized in the first available clock cycle, the two remaining bytes in the following.

Two syndromes are read, for example, out of banks B2 and B3. At the same time, two syndrome generators update the syndromes assigned to the previous data byte while the results from the preceding cycle are stored in banks B0 and B1.

Concurrently, the data bytes are transferred into the buffer manager. This requires that the control logic provides an index signal that is used to write the data bytes into the correct memory location.

2. Error correction information is calculated from the syndromes:

A list of completed syndrome sets is maintained in the control logic.

The 172 syndromes of a syndrome set are transferred to the error corrector and once the error correction information is obtained it is transferred back into the syndrome buffer. (In FIG. 10 this is illustrated as happening for Syndrome 1, although the address of the syndrome will of course vary.)

3. Correction information is written into the external memory:

Once all 172 sets of correction information have been obtained from the error corrector, the error magnitude and address is transferred to the buffer manager. (This is shown happening for syndrome 2N−2 in FIG. 10, by way of example only.)

Control logic 900 generates an index signal that indicates to which ECC sector the corrections belong.

4. Cache partial syndromes in external memory:

Each time a partial syndrome set has been generated, the 172 syndromes are read out of the syndrome buffer and transferred into external memory. (Shown happening to Syndrome 2N−1 in FIG. 10.) During the transfer, the multiplication with the correct alpha value is performed (transfer into external memory is not time-critical).

This requires the control logic to generate an address for the buffer manager.

The control logic monitors the IDs of incoming ECC sectors and once a sector is found that corresponds to a partial syndrome set, syndrome calculation is performed until it contains the information from the EDC frames that is not contained in the partial syndromes that is cached in external memory.

The first partial syndrome is retrieved from external memory and combined with the second partial syndrome in the syndrome buffer. This requires a read-modify-write operation.

Buffer Manager

Figure 10:
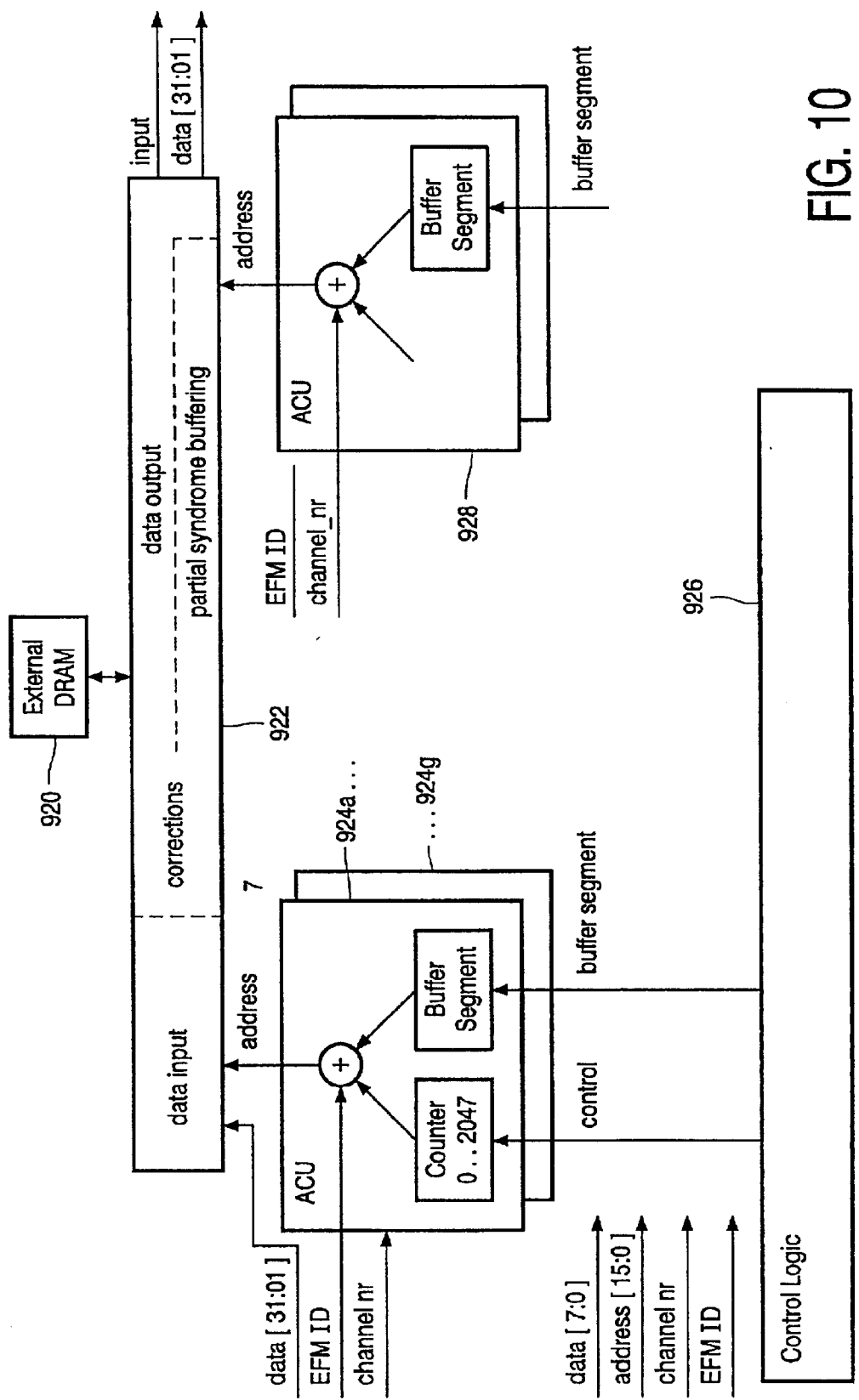
FIG. 10 shows in more detail an external memory interface in the circuit of FIG. 8.

FIG. 10 shows in more detail the buffer manager (corresponding to block 513 in FIG. 6) that receives the data arid the outer corrections coming form the DVD error corrector and stores them in the external DRAM 920 or other memory. Interface logic 922 manages the addressing and transfer of input data being read from the disc, corrections, partial syndromes and output data being retrieved and streamed out via the host interface (512 in FIG. 6).

Although in a multi-track system the buffer manager maintains only one data input and one correction input channel, there is still a significant difference to a single channel system. This is because in a multi-track system the data transferred at any one time originates from N=7 different ECC recording sectors. Hence, the buffer manager must contain N address calculation units (ACUs) 924a–g that generate the addresses for the external DRAM. The association of an incoming data item to a particular ACU is done via an index signal that is provided by the outer error correction section (FIG. 10). Address generation inside an ACU is be based on a running index, related to the number of incoming bytes, a part that is related to the EDC ID number, and a part that is programmable by the control CPU. In this way, it can be arranged that the data between two jumps is retrieved and sorted into the external memory without further CPU interaction.

As explained already with reference to FIG. 7, a jump of N−1 tracks is required once the data of a disc revolution has been read. To establish the right jump time, the apparatus monitors whether all EDC frames that are present on the corresponding disc tracks have been retrieved without error and stored in the DRAM. To this end, the buffer manager in the present embodiment has the following specific functionality (alternative arrangements are of course possible), provided by control logic 926.

Each EDC frame is represented by a single bit (or by a set of bits) in a small register file. These bits indicate the status of each EDC frame including: not received, in transfer, data and corrections received, unrecoverable error. Using simple logical operations it is then possible to know at any given time whether a consecutive set of EDC frames has been received without error, and therefore a jump should be performed. Jumping is initiated by interrupt to a controlling CPU, which may be on the same IC as the decoder. Similarly, an interrupt should be generated when some EDC frames are erroneous. In this case, of course, the jump should be delayed such that the EDC frames in question are read again on the following disc revolution, this time by a different input channel.

In addition to the above mentioned functions, the buffer manager requires also an additional channel with ACUs 928 for the caching of partial syndromes. This channel is used only for burst transfers and should have higher priority than other channels. This is because the corresponding data must be read from and written to the outer syndrome buffer which has only limited bandwidth available.

The bandwidth requirements to the external memory is determined in the described 64× system by the rate at which data is retrieved from the channel side, the number of outer corrections and the host interface bandwidth. As described earlier in this chapter, the data rate from the error corrector is 120 MByte/sec. This should, on average, also be the host interface data rate. In addition, a bandwidth of about 3.5 MByte/sec is required for the caching of partial syndromes (assuming a 11.5× spin speed, around 110 jumps are performed per second, and after each jump 6 partial syndromes of 16 times 172 bytes must be read and written). Furthermore, around 70 MByte/sec are needed for the read-modify-write needed to write the corrections into the external memory (3567 ECC sectors per second with a maximum of 172×8 corrections, each needing around 15 clock cycles). This is in total a bandwidth requirement of 315 MByte/sec.

Concluding the description of the detailed embodiment, we see that the advantages of this implementation include:

No large input buffer is required for the stitching together of raw data.

Full performance of external memory interface available for user data.

Area and power efficiency (utilizes existing decoder architecture that requires a 50 MHz clock to achieve 32× DVD performance).

Works on EDC frame granularity (if that more complex scheme for address generation and data checking is acceptable, it is possible that even PI-codeword or EFM frame granularity is achievable).

Blocks for bit detection, EFM demodulation, inner and outer syndrome generation, error correction and host interface can be reused without problems.

Some new circuit blocks are required, relative to conventional single-track hardware:

Row buffer control logic that is capable of generating addresses for the N input data streams and is able to identify when a row has been completed and syndrome generation as well as error correction must be initiated.

Control logic in the outer error correction section that maintains a set of syndrome buffers and assigns those to the input channels. This logic also needs to identify which syndromes are complete and available for error correction. Furthermore, addresses or address indices for the user data buffer (data and corrections) must be generated.

Buffer manager needs additional input that is used in the address generation for user data and corrections. It must be possible that the control logic in the outer error corrector section generates an address or address index that allows to associate the current user data or corrections with the memory segment that is allocated to a particular EDC or ECC frame. Additional address calculation units (ACUs) may be needed, depending on system implementation.

The invention, and the techniques disclosed herein are not limited to the DVD system, nor to optical discs in general. In particular, other systems may be known or envisaged which employ a block-based error protection scheme, and where double buffering of syndromes bring a performance and/or cost advantage. These other applications, and variations of the techniques disclosed herein, will be readily apparent to the skilled reader.

What is claimed is:

1. A method of reproducing data from a continuous data stream, the data stream incorporating an error protection code applied on the basis of a predetermined size of data block, the method comprising:

(a) providing a plurality of syndrome buffers for use in an error correction process, each capable of storing an error correction syndrome from which corrections of data within such a data block may be derived; and processing said data stream by steps including:

(b) using a first one of the syndrome buffers to accumulate a first syndrome applicable for correction of a first data block;

(c) storing the data for said first data block in a data buffer, without applying corrections derived from said first syndrome;

(d) using a second one of the syndrome buffers to accumulate a second syndrome from which corrections of data within a second first data block may be derived;

(e) storing the data for said second data block in a data buffer, without applying corrections derived from said second syndrome;

(f) concurrently with step (d), using the accumulated first syndrome in the first syndrome buffer to calculate the corrections applicable to said first data block; and (g) after step (e), releasing the first syndrome buffer for use in accumulating a syndrome for a subsequent data block; and (h) using the accumulated second syndrome in the second syndrome buffer to calculate the corrections applicable to said second data block, the process continuing in like manner until all desired data blocks have been processed.

2. A method as claimed in claim 1 wherein in each of the steps (e) end (g) the results of the correction calculations are stored is the first and second syndrome buffers, over-writing the accumulated first and second syndromes respectively.

3. A method as claimed in claim 1 wherein the method further comprises (h) applying corrections to each respective block of data in accordance with the results of the correction calculations performed in steps (e) and (g).

4. A method as claimed in claim 1 wherein the corrections are applied to the data by read-modify-write operations at selected locations in the data buffer.

5. A method as claimed in claim 1 wherein the first and second syndrome buffers are designated block-by-block from among a set of more than two physical syndrome buffers.

6. A method as claimed in claim 1 wherein the received data stream is one of a set of N sub-streams being read in parallel, starting from N respective locations within a single recorded data stream, step (a) providing at least 2N physical syndrome buffers.

7. A method as claimed in claim 6 wherein the single recorded data stream comprises data recorded in a spiral on a disc-like record carrier.

8. A method as claimed in claim 6 wherein in a multi-track implementation, said data stream may commence part way through a data block, step (b) comprising accumulating a partial syndrome only, the method further comprising (i) storing said partial syndrome and subsequently completing the syndrome when the beginning of the same data block is received in another of said streams.

9. A method as claimed in claim 8 wherein step (i) includes transferring the partial syndrome from the first syndrome buffer to said buffer memory.

10. A method as claimed in claim 9 wherein the partial syndrome is transferred back into one of said syndrome buffers for completion.

11. A method as claimed in claim 1 wherein the first and second syndromes form part of an outer error correction process, each data block comprising a number of sub-blocks subject within themselves to an inner error correction process, the data stored in step (c) block being stored in said buffer after undergoing said inner error correction process.

12. A method as claimed in claim 11 wherein said sub-blocks may be regarded as rows of a two-dimensional matrix, the inner error correction being applied to individual rows the matrix, relatively localized within the received data stream, while the outer correction process is applied to columns of the matrix, extending relatively widely within the data stream.

13. A method of data processing, the data comprising DVD data recorded on a optical disc, wherein double buffering is used for outer error correction syndromes, the syndrome for one ECC frame being accumulated in one syndrome buffer, while error correction calculations for preceding data block are performed using a syndrome accumulated previously in another syndrome buffer, the syndrome buffers being used in turn as further blocks of data are received.

14. A method as claimed in claim 13 wherein the data for each block are transferred to a buffer memory not integrated with the syndrome buffer, before the corresponding corrections are calculated or applied.

* * * * *